H. BRUNIUS.
ELECTRO-MAGNETIC RAILROAD SIGNAL.

No. 189,999.

8 Sheets—Sheet 1.

Patented April 24, 1877.

H. BRUNIUS.
ELECTRO-MAGNETIC RAILROAD SIGNAL.
No. 189,999.  Patented April 24, 1877.
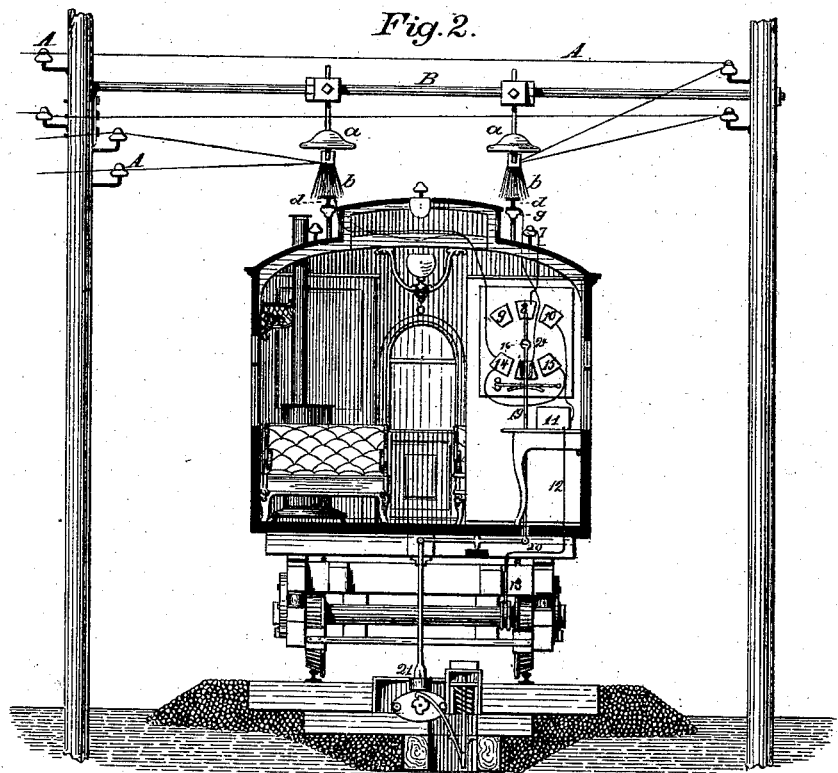
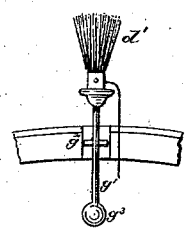
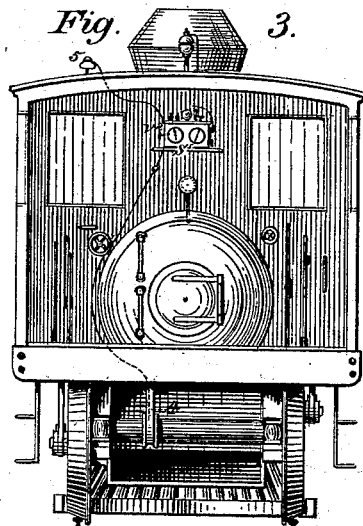
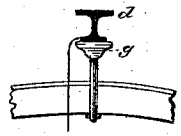

8 Sheets—Sheet 3.

H. BRUNIUS.
ELECTRO-MAGNETIC RAILROAD SIGNAL.

No. 189,999. Patented April 24, 1877.

Attest:

Inventor:
Hakon Brunius,
by Louis Bagger & Co.
Att'ys.

8 Sheets—Sheet 4.

H. BRUNIUS.
ELECTRO-MAGNETIC RAILROAD SIGNAL.

No. 189,999. Patented April 24, 1877.

Attest:

Inventor:
Hakon Brunius,
by Louis Bagger & Co.,
Att'ys

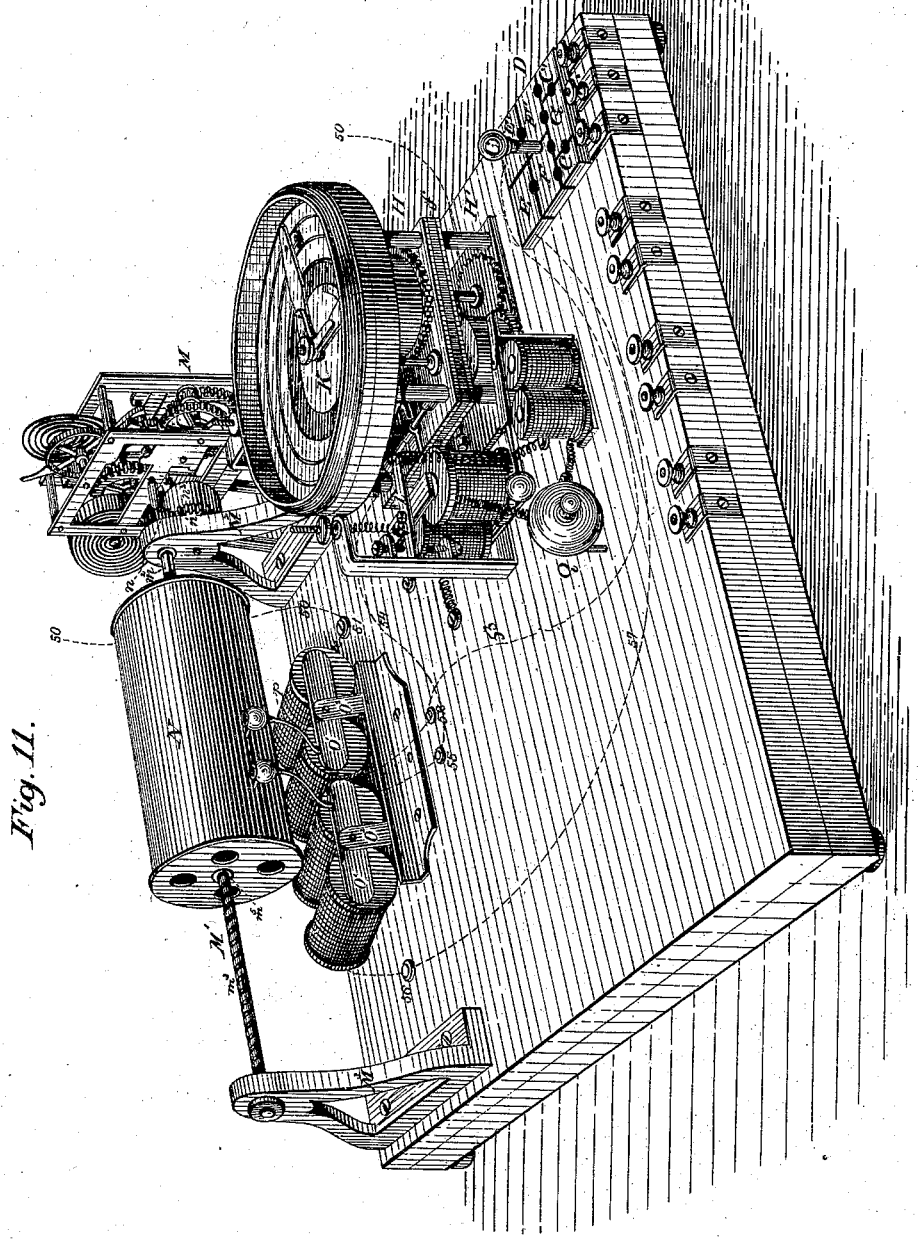

8 Sheets—Sheet 6.
H. BRUNIUS.
ELECTRO-MAGNETIC RAILROAD SIGNAL.
No. 189,999. Patented April 24, 1877.
Fig. 12.
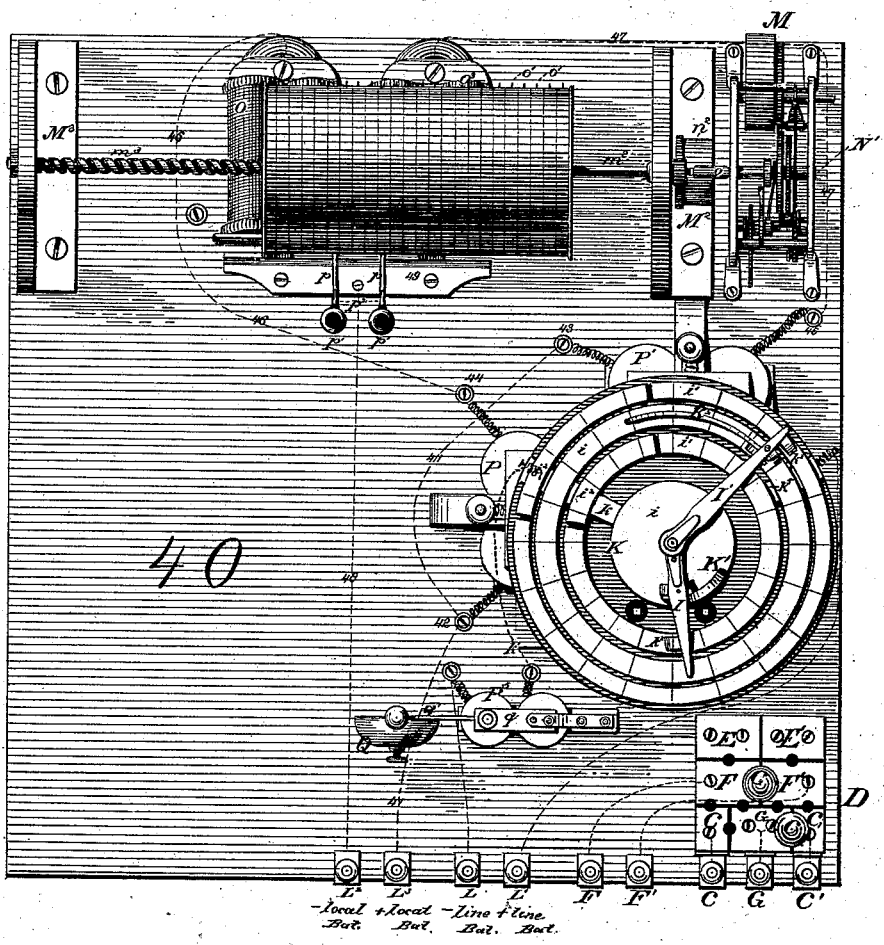
Fig. 14.
Fig. 13.
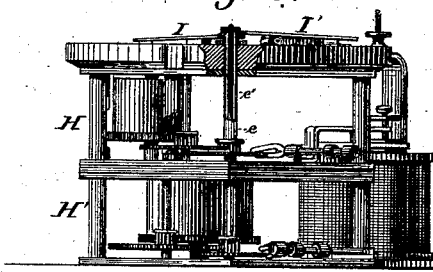
Fig. 15.
Attest:
Fig.  16.
Inventor:
Hakon Brunius,
by Louis Bagger & Co.
Att'ys.

8 Sheets—Sheet 7.

H. BRUNIUS.
ELECTRO-MAGNETIC RAILROAD SIGNAL.

No. 189,999. Patented April 24, 1877.

Attest:

Inventor:
Hakon Brunius,
by Louis Bagger & Co.
Att'ys.

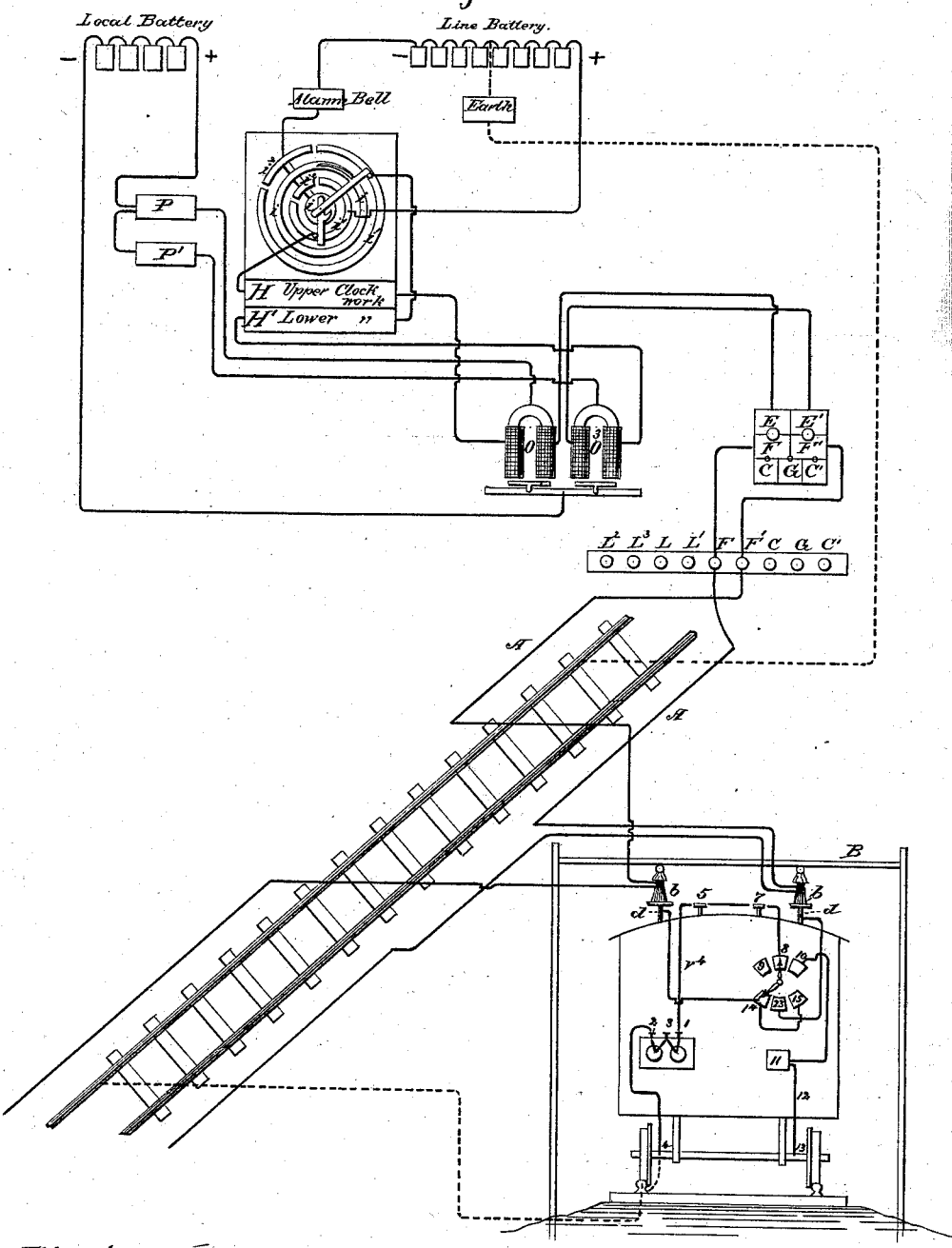

UNITED STATES PATENT OFFICE.

HAKON BRUNIUS, OF JÖNKÖPING, SWEDEN.

IMPROVEMENT IN ELECTRO-MAGNETIC RAILROAD-SIGNALS.

Specification forming part of Letters Patent No. 189,999, dated April 24, 1877; application filed August 26, 1876.

*To all whom it may concern:*

Be it known that I, HAKON BRUNIUS, of the city of Jönköping, Sweden, have invented certain new and useful Improvements in Electric Railway-Signal Apparatus; and I do hereby declare that the following is a full, clear, and exact description thereof, which will enable others skilled in the art to which it appertains to make and use the same, reference being had to the accompanying drawings, which form a part of this specification.

Figure 1:
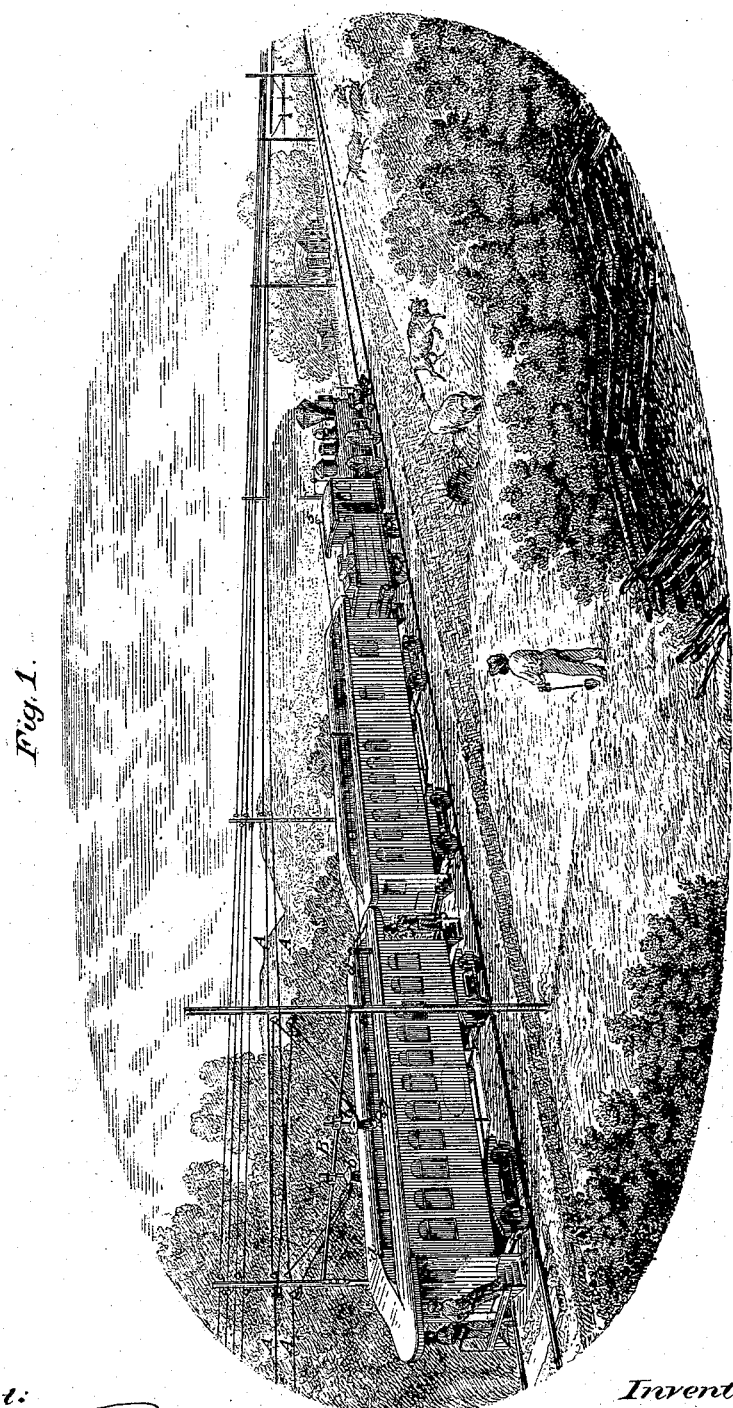
Figure 7:
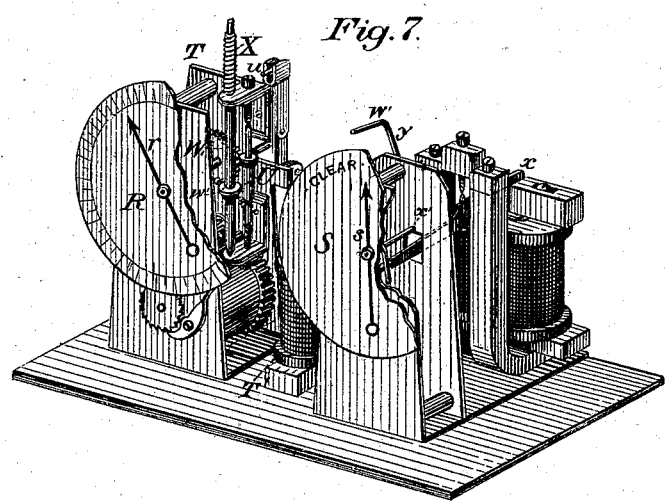
Figure 8:
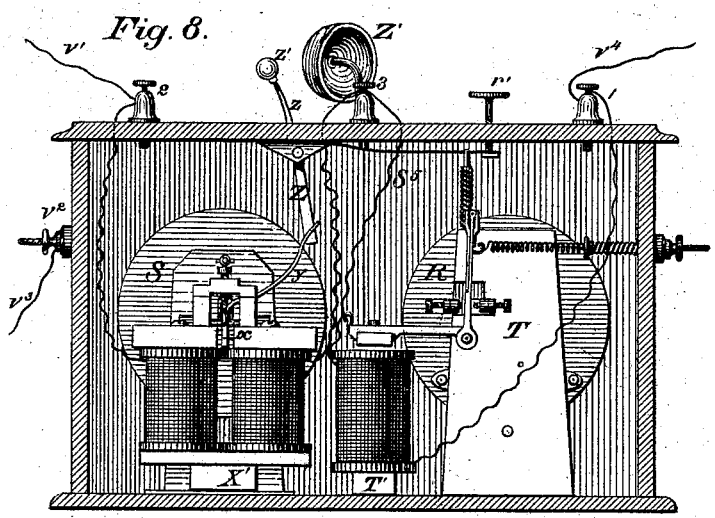
Figure 9:
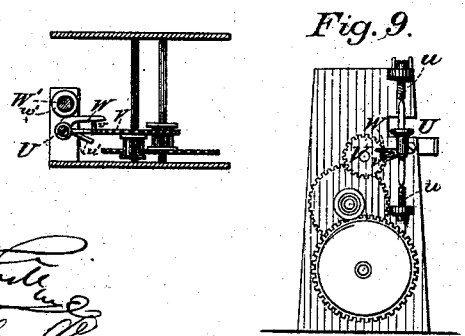
Figure 10:
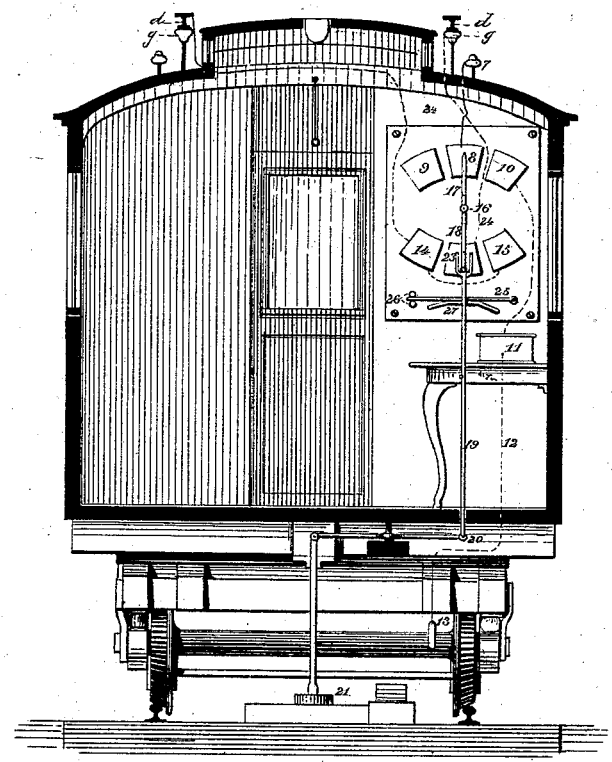
Figure 17:
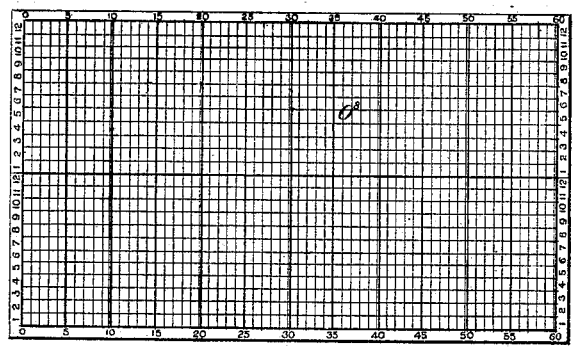
Figure 21:
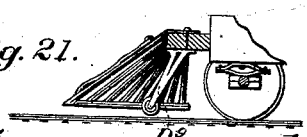
Figure 18:
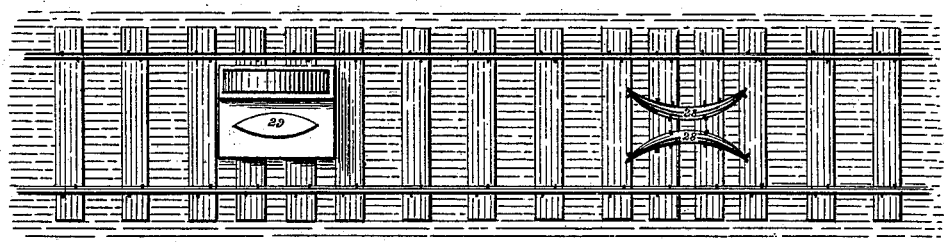
Figure 19:
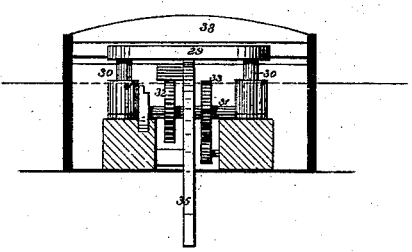
Figure 20:
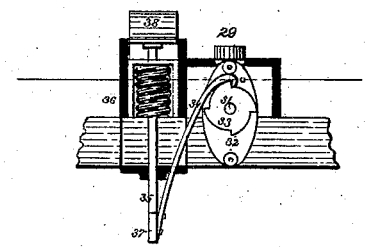

Figure 1 shows, in perspective, a section of a railroad-line having my improved signaling apparatus. Fig. 2 is a cross-section of a car and the track near a station. Fig. 3 shows the locomotive train apparatus in position. Fig. 4 is a sectional view of one of the metallic train-contacts. Fig. 5 is one of the brush-contacts in position upon the car. Fig. 6 is the locomotive insulating-cap 5, with plate 6. Fig. 7 is a perspective view of the train apparatus, the covering-box being removed. Fig. 8 is a rear elevation of the same. Fig. 9 is a detail view of parts of the mechanism of the train apparatus. Fig. 10 is a section of a car, showing the arrangement of the levers. Fig. 11 is a perspective view of the station apparatus. Fig. 12 is a top plan of the same, Fig. 13 shows part of the clock-works H H' and spindles $e$ $e'$. Fig. 14 is one of the hands detached from the dial. Fig. 15 shows the method in which shaft $m^2$ and screw $m^3$, upon which cylinder N travels, are united. Fig. 16 shows the minute-hand spindle $N^1$ of clock-work M, with ratchet-wheel $o^3$ and pawl $o^4$. Fig. 17 is the time sheet or blank. Fig. 18 is a plan view of the track outside a station. Fig. 19 is a longitudinal section of the mechanism under the track. Fig. 20 is a cross-section of the same. Fig. 21 is a side elevation of the bolt $D^9$ arranged in front of the locomotive for operating bridge 38, and Fig. 22 is a diagram showing the circuits of the line and local batteries.

Similar letters of reference indicate corresponding parts in all the figures.

The object of this invention is to produce an apparatus which will—

First, enable the superintendent of a railway station or depôt to properly control the movements of trains: first, by automatically registering the time of arrival and departure of each train; second, by indicating the position of each train at any time, thus affording a reliable control over the speed of the trains; and, third, by indicating the exact time when each train passes certain given points.

Second, guard against accident by collision of trains, or otherwise, by, first, indicating to the conductor (or engineer) of each train how far his train is from the departure or arrival station; and, second, giving the danger-signal whenever two trains are approaching each other on the same track.

The construction, arrangement, and operation of my improved electric railway-signal apparatus are as hereinafter more fully shown and specified.

In order to properly accomplish the various objects of my invention there must be two ordinary telegraph-lines along the railroad, as shown in the drawings at A A. At certain points, selected as hereinafter described, the telegraph-poles are connected above and across the track by cross-bars B bearing contacts, consisting of metal brushes $b$ affixed in insulators $a$, the latter being arranged to slide vertically upon the cross-bars B in such a manner that they may be secured at any desired height by set-screws or otherwise. At these points the telegraph-wires branch off, and are connected to the contacts $b$, as shown. The contacts $b$ are adjusted at such a height that they will engage, without fail, with the corresponding contacts of all passing trains. The train-contacts may consist, like the line-contacts $b$, of metal brushes, as shown in Fig. 5, where they are denoted by the letter $d'$, or they may consist, as in the remaining figures, of strips of T-iron, $d$ $d$, this latter form being especially convenient for fast-going trains. When this latter form of train-contacts are used the T-irons are carried by insulating-caps $g$; but when brush-contacts are used I prefer to arrange them, as in Fig. 5, in insulating-handles $g^1$, pivoted at $g^2$, and extending below the roof of the car upon which they are placed, where they have balance-weights $g^2$ to keep them in a vertical position. The train-contacts must, of course, in all cases be so arranged as to insure certainty of action with the line-contacts. The arrangement of the contacts just described may, if desirable, be reversed, so that the line-contacts may be formed by T-irons and the train-contacts of brushes; or the contacts may be arranged along and upon the sides of the cars without changing the spirit of my invention.

The apparatus constituting my invention may be said to consist, beside the telegraph-lines and contacts just described, of three parts, viz: the station apparatus, the train apparatus, and the road apparatus. I will now proceed to describe these in the order named.

The station apparatus consists of, first, a line-battery of, say, twenty elements; second, a local battery of, say, five elements; third, a reversing appliance, (shown at D in Figs. 11 and 12,) which is so arranged that its line-rails F F', by changing the knobs $cc$, can be put into current-connection with the station apparatus E E', or with the telegraph-rails C C', or to earth G; fourth, the apparatus for automatically reversing the current of the line-battery. This is shown in Figs. 11 and 12 of the drawings. The object of this apparatus is to cause a bell-signal to be given to the engineer of each train when it comes within a certain distance of the station, and to give the same signal to the station-officers, in order that they may prepare for the arrival of the train. This apparatus also comes into play when, in case of two trains following in rapid succession upon the same line of rails, the latter train should chance to overtake the former. The stop-signal will then be given to the latter train in ample time to prevent a collision. The construction and operation of this apparatus are as follows:

H H' are two clock-works, placed one above the other, and insulated from each other by interposed bone plates $f$, or in any other suitable way. The spindle $e$ of the upper clock-work is hollow, and works independently of the spindle $e'$ of the lower clock-work, which passes through it, the two spindles being insulated from each other. The metallic bodies of the two clock-works H H' are connected by wires with the windings of two relays, O O³, respectively. The other ends of the windings of relays O O³ connect with the plates E E' of the reverser D, and from there through plates F F' with the two telegraph-lines A A. Above the clock-works is a dial, K, made of wood, porcelain, bone, or other insulating material, and upon this dial move the hands I I' carried by the spindles $e$ $e'$, respectively. Upon the face of the dial are secured four rings, $i$ $i^1$ $i$ $i^1$. Two of these, $i^1$ $i^1$, which are the second, and the fourth, counting from the center, are not complete, but consist each of two parts, $i^1$ $i^2$, the latter forming independent staples, which are in metal contact through a metal strip, $k$, with the two complete rings $i$ $i$. Rings $i^1$ $i^1$ are connected by a metal strip, $k^5$. The dial is divided into a number of degrees equal to the number of line-contacts upon the railroad. Of these degrees the staples $i^2$ occupy the four last before zero or the station-degree. The rings $i$ $i$ and staples $i^2$ $i^2$ are connected by a wire with the negative pole of the line-battery, the wire forming the winding of an electro-magnet, P⁵, the armature of which, $q$, operates a signal-bell, Q. The rings $i^1$ $i^1$ are similarly connected with the positive pole of the line-battery. The center of the line-battery is to earth.

The hands I I', (shown in detail in Fig. 14 of the drawings,) carried by the spindles $e$ $e'$, are constructed almost exactly alike, the difference being in the size. The smaller of the hands I extends to the second ring $i^1$, with which it is in metal contact by means of a small bent platina plate or spring, $k^2$. The large hand I' extends to the fourth ring, with which it is similarly in contact by a spring, $k^3$. The hands are made of steel or other suitable material, and are made in two pieces hinged together in such a manner that the outer part may be raised from the dial. It is, however, usually kept upon the dial by means of a small spring, $k^4$. Secured to the under side of hand I, and traveling upon the first ring $i$, is a small bone plate, to which is hinged a metal staple, $k^1$, which is in metal contact with the first ring $i$—that is, with the negative pole of the line-battery. The bone plate serves to insulate the staple K¹ from the hand I. Similarly affixed to the under side of the hand I' is a metal staple, K², which is in metal contact with the third ring $i$, and, consequently, also with the negative pole of the line-battery. The staples K¹ K² cover about three and a half degrees or divisions of the dial, and are so arranged that when the hand I' reaches staple K¹ the latter lifts it off contact with the outer ring $i^1$. If the hand I reaches staple K² it is in the same manner thrown out of contact with the inner ring $i^1$.

The actuating mechanism of the clock-works H H' consists of two electro-magnets, P P¹, the armatures of which operate levers $l$ $l'$, which, by any suitable intermediate mechanism, operate the driving-wheels of the spindles $e$ $e'$ the space of one tooth (equivalent to one dial-degree) each time the armature is operated by the electro-magnet. The detailed construction of this operating mechanism does not vary in any essential particular from that now usually employed in telegraph-offices and other places.

The electro-magnets P P¹ are both in the local circuit, which is formed as follows: A wire passes from the positive pole of the local battery to a set-screw, 42, where it connects with one end of the winding of magnet P; from there it passes to another set-screw, 43, where it connects with the winding of magnet P¹. The other ends of the windings of magnets P P¹ connect with the legs of relays O O³, respectively. The negative pole of the local battery is connected to the metallic framing 49 of the armatures of the relays. The legs of the relays have platina points, or special contact-screws, which the armatures strike when attracted by the relay electro-magnets, thus closing the local circuit, and causing the operation of the electro-magnets P P$^1$. It is obvious that when it is the relay O which, excited by the line-current, causes this operation, it is only the electro-magnet P that is operated, the magnet P$^1$ being in the meanwhile out of the circuit, and vice versa when the relay O$^3$ is in operation.

The line-circuit is as follows: From the positive pole of the line-battery the current passes to the rings $i^1 i^1$ of dial K; from thence, through hands I I', into the bodies of the clock-works; next, through the windings of the respective relays O O$^3$; then to the plates E E' of the reverser D; and, finally, through plates F F' to the telegraph-lines A A, the contacts of which are, consequently, charged with positive electricity. When the contacts are closed by passing trains (the apparatus of which is hereinafter more fully described) the current passes into the rails, and through the rails to earth, which connects with the center of the line-battery. A perfect circuit is thus formed. Each time the circuit is closed by a passing train the station apparatus is brought into play, and the dial-hand of the train is moved forward one degree. As the train approaches the station, the hand approaches the staple $i^2$; and when the train reaches the first station-contact, (the fourth from the station,) the hand passes from the ring $i^1$ over upon the staple $i^2$. This latter, being charged with negative electricity, changes the path of the current, with the following result: From the negative pole of the battery the current traverses the coil of the electro-magnet P$^5$ of the alarm-bell Q; (which is thus sounded, indicating the approach of the train;) then into the staple $i^2$, through the hand, clock-work, relay, and to the telegraph-line; from the contacts through the train apparatus (where it gives the engineer a stop-signal, as hereinafter described) down to the rails, and through the rails to earth, which connects with the center of the line-battery, thus completing the circuit.

Exactly the same operation is the result if one train should overtake another upon the same line. The dial-hand of the following train will then overtake that of the first train, when it will be lifted off the ring $i^1$ by the insulated staple K$^1$, (or K$^2$, as the case may be,) from which it receives a negative current of electricity, thus causing the operation of the stop-signals.

Fifth, a clock-work, M, shown in Figs. 11 and 12 of the drawings: The object of this is to actuate the mechanism by which the exact time of the arrival and departure of trains is recorded. For this purpose I employ a metallic cylinder, N, traveling horizontally upon a rod, M$^1$, which rests in two metallic brackets, M$^2$ M$^3$. The rod M$^1$ is made of two pieces, $m^2 m^3$, one of which, $m^2$, is an ordinary square rod, which fits into a corresponding square slot, $m^4$, in the end of the cylinder, pointing toward the clock-work, and the other of which, $m^3$, is screw-threaded, as shown in the drawing, so as to fit into a corresponding screw-threaded perforation, $m^5$, in the cylinder. The end of the screw-threaded rod has a round slot or mortise, into which fits the end of the square rod, which has been previously rounded, so as to revolve freely. The screw-threaded rod is affixed solidly in its bearing or bracket, while the square rod revolves freely. Thus, when the square rod is operated, it causes the cylinder to rotate and travel upon the screw-threaded rod in either direction. The end of the square rod $m^2$ has a pinion, $n$, which engages with a gear-wheel, $n^1$, that is operated by a spring contained in a box, $n^2$, independent of the clock-work. This is in order to compensate for the friction caused by the rotation of the cylinder in traveling upon the rod M$^1$. The length of the rod M$^1$ must be at least twice that of the cylinder. It is connected by means of a sleeve or coupling, $o$, with the minute-hand spindle N$^1$ of the clock-work M, and by this means it is caused to rotate just once an hour. The screw-thread upon the rod should be cut in such a manner that twenty-four turns of it would be exactly equal to the length of the cylinder N, and in this manner the cylinder will be caused to travel its own length upon the rod exactly once in twenty-four hours. The clock-work M may be regulated by the station-clock, by electro-magnet escapement, or in any other suitable manner. The cylinder has upon its surface two rows of short sharp teeth or barbs, $o^1$, by means of which a sheet of paper, O$^3$, may be readily affixed upon the cylinder. This (the time-sheet) I have shown in Fig. 17 of the drawings. It consists of an ordinary sheet of white paper, the width of which is equal to the length of the cylinder, and which is ruled lengthwise into twenty-four spaces or divisions of equal width; sidewise it is divided into sixty spaces or degrees of equal length; each of the spaces lengthwise indicates one minute, and each of the spaces counting sidewise indicates one hour. When this sheet is affixed upon the cylinder in the manner shown in Fig. 12, and the cylinder travels down along the rod M$^1$, each of the lengthwise spaces occupies just one minute in passing a given point, while by each revolution of the cylinder it moves down the rod exactly the distance of one of the sidewise spaces. The spaces may, if desirable, be numbered or lettered, so as to indicate the exact time.

O O$^3$, the two relays, are placed under the cylinder midway between the brackets M$^2$ M$^3$. Their front ends are in any suitable manner raised so as to slant upward against the armatures O$^1$ O$^1$. The armatures are affixed upon steel springs O$^2$ O$^2$, that keep them at the desired distance from the arms of the electro-magnets without the aid of screws. In each of the armatures is fixed a bent rod, $p$, carrying an ink-holder, $p^1$, from which the ink may escape through the capillary groove or tube $p^2$. While the apparatus is resting or not in motion, the points of the tubes $p^2$ are at but a short distance from the surface of the cylinder, but when the electric current causes the electro-magnets to operate the armatures the points $p^2$ $p^2$ are forced down upon the surface of the cylinder or the time-sheet placed thereon, thus marking the exact time of such operation. Instead of the ink-holders $p^1$ $p^1$, any other suitable marking device may be employed in combination with the electro-magnets and armatures without changing the spirit of my invention.

The manner in which the rod $M^1$ is connected with the minute-hand spindle is, as beforesaid, by means of a sleeve or coupling, $o$. When the clock is wound, the minute-hand spindle is, at the same time, turned from the front of the clock-work by means of a key, thus rotating the rod $M^1$, and causing the cylinder to travel up to the clock-work until its opposite end, or the exact time, is exactly opposite the markers $p^2$; and in order to prevent the cylinder from returning automatically by the force of the spring contained in box $n^2$, I place upon the minute-hand spindle a spur or ratchet wheel, $o^3$, and upon the gear-wheel $N^5$, which is sleeved upon the minute-hand spindle (or arbor) $N^1$ of the clock-work, I arrange a spring-pawl, $o^4$, engaging therewith, (as shown in Fig. 16,) thus preventing the cylinder from traveling back unless actuated by the clock-work.

I shall now proceed to describe the part of my improved railroad-signaling apparatus which is used upon the train, and which, therefore, I call the "train apparatus."

The object of this is to indicate, for the information of the conductor or engineer of the train, by means of hands arranged to move upon suitable dials, at what point of the road the train is, and how far it is from the departure or arrival station; and, further, to give the alarm, by means of an alarm-bell operated by an electro-magnet, in case another train should happen to approach on the same track, either in the same or the opposite direction.

The train apparatus consists of a small square box, $S^5$, placed in any suitable conspicuous place in the engineer's cab on the locomotive. In front, this box has two dials, R S, upon each of which moves a hand, $r$ $s$. The dial R is divided into a number of spaces or degrees, equal, at least, to the number of line-contacts between the two most distant stations upon the line. The dial S has only two divisions, between which the hand $s$ vibrates. These divisions are marked and used to indicate "clear" and "block," and the hand, when the apparatus is at rest, always points to clear. Behind the dial R is a clock-work, T, operated like clock-works H H', at the station, by an electro-magnet, T', the lever of which each time the current causes it to operate, operates the hand spindle the space of one tooth, or, in other words, one degree upon the dial.

Connected with the clock-work T and electro-magnet T', is a mechanism by means of which the hand $r$ may, at any time be returned to zero, by simply pressing upon a button, $r'$, upon the outside of the box. This mechanism I shall now proceed to describe.

U is a vertical shaft, having its bearings in the ends of two vertical screws, $u$ $u$. This shaft has two sidewise projections, $u'$ $u'$, by which the clock-work is operated, when actuated, by the electro-magnet, and one of which, when the apparatus is at rest, presses against the teeth of the wheel V upon the hand-spindle, thus preventing it from rotating. This wheel V has a small sidewise projection, $v$. The shaft U has a sidewise-projecting arm or bracket, W, which is operated by a conical circumferential projection, $w'$, upon a vertical shaft, W', placed parallel to, and at a short distance from, the shaft U, and which is always held raised by a spring, X, so as not to cause the conical projection $w'$ to interfere with the working of the machine. When this shaft is depressed, the conical projection $w'$ forces the bracket W of shaft U sidewise until it reaches the wheel V upon the hand-spindle. The projections $u'$ $u'$ are thus thrown out of gear, and the wheel V is rotated by the spring of the clock-work until its projection $v$ reaches the bracket W of shaft U. The projection upon the gear-wheel is placed in such a position that, when it reaches the bracket W, the hand $r$ shall point to zero. When the shaft U is let go of, the projections $u'$ $u'$ return to their original position in gear with the wheel V, and the apparatus is again ready for operation.

X' is a polarized relay, which is placed behind the dial S. $x$, the armature, is suspended between the poles of the magnet, and serves to give to the spindle $x'$, which carries the hand $s$, a rotating motion. This spindle $x'$ carries an upward-projecting arm, Y, which, with the spindle, moves to and fro. Z is a short lever, pivoted to the cover or upper side of the box, in such a manner as to be operated by the arm Y when the spindle $x'$ is rotated. The lever Z terminates above the box in a short spring, $z$, carrying a metallic ball or hammer, $z'$, which, by striking against an alarm-bell, Z', gives the alarm whenever, by the action of the electric current, the spindle $x'$ is vibrated so as to cause the hand $s$ to point to "Block," or, in other words, when there is danger.

1 is a contact-screw, connected to the wire of the clock-work electro-magnet. 2 is a contact-screw, connected to that of the relay; and 3 is a third contact-screw, connected to the junction of the two wires. The wires must all be well insulated, and wound around the relay electro-magnet in such a manner that the hand $s$ shall point to "Clear" when the positive current enters the apparatus. The apparatus is embraced in the line-circuit (which is closed by the train-contacts $d$ touching the line-contacts $b$) in the following manner:

$v^4$ is a wire, leading from the screw 1 (where it connects with the wire of electro-magnet T') to an insulated cap, 5, on top of the locomotive. Here it connects with another wire, leading to an insulated cap, 7, on the top of the conductor's van in one of the cars of the train, and it terminates in a metal plate, 8, inside the van. 8 is one of six plates, (8 9 10 14 15 23, shown in Figs. 2 and 10,) all arranged, in relation to each other, as shown in the drawings, and all originally insulated from each other. Plates 14 and 15 are in metal connection by a wire, as shown, and are connected by a wire leading from either plate, with one of the train-contacts $d$, and consequently, when the contacts are closed, with one of the line-wires. Plate 23 is similarly connected with the other line-wire, by a wire leading from it to the other train-contact $d$. Plate 10 is connected with the train-telegraph 11, from which a wire, 12, leads to a spring, 13, pressing against one of the axles of the car. 16 is a pin, carrying two springs, 17 18, capable of turning independently, but pressing well against each other. The plates are arranged, as shown in the drawing, in two rows, 9 8 10 forming the upper row, and 14 23 15 the lower. The spring 17, which is set by hand, can be so turned as to rest upon either of the upper plates, and spring 18, which is set automatically by the mechanism hereinafter described, (the "road apparatus,") always rests upon one of the lower plates.

In order to cause the train apparatus to operate, the spring 17 must rest upon plate 8, and spring 18 upon either of the lower plates, of which 14 and 15 are connected with one train-contact, and 23 with the other. To illustrate: Let it be supposed that spring 18 rests upon plate 14; then, when the contacts $d$ of the train touch the line-contacts $b$, a current will pass from the positive pole of the line-battery at the station to the plates $i^1$ $i^1$ of the current-reverser; from thence through the hands I I'; then through the bodies of the clock-works, through the windings of the relays, to the plates E E' of the reversing appliance, through the plates F F' to the lines, and to the contacts. Of the contacts, one is connected with plate 23 in the conductor's van, which, at the time, is isolated, thus throwing the entire line, with one of the relays at the station and one of the hands of the current-reverser, out of the circuit. The other line-contact is connected with the plates 14 15. These communicate, through the springs 17 18, with the plate 8, which again is connected with the wire $v^4$ of the box containing the locomotive apparatus in the engineer's cab. The current passes through this, out through screw 2, and finally to the metallic body of the locomotive, which, through the rails, establishes the earth-line. The earth-plate at the station, being connected to the center of the line-battery, completes the circuit.

When the line-circuit is closed the following operations consequently take place: First, one of the relays at the station is excited, thus operating the recording mechanism. Second, this operation closes the local circuit, and causes one of the hands of the current-reverser to be moved forward one degree. Third, the hand $r$ of the dial R in the engineer's cab is moved forward one degree. These operations, of course, are simultaneous, and serve to indicate to the station officials the position of the train by the position of the hand upon the dial of the current-reversing apparatus, and the exact time of the operation by the recording apparatus. The recording apparatus thus also serves to indicate the average speed of the trains, provided, of course, that the distances between the respective line-contacts are known. To the engineer the position of the hand $r$ indicates his exact position upon the line—in other words, the exact distance that his train is at the time from the departure and arrival stations, respectively. The hand $s$ of the dial S in the engineer's cab, being controlled by the electro-magnet X', the wire of which is wound in such a manner as to cause the hand to point to "Clear" whenever influenced by a positive current, remains undisturbed until the dial-hand I or I' of the train reaches the staples $i^2$ $i^2$, or until one train overtakes another, thus causing one hand to overtake the other upon the dial of the current-reverser, the result of which would be to reverse the current, as already described, thus causing the circuit to begin at the negative instead of the positive pole of the line-battery, and thus also causing the operation of the signal-bells at the station and on the train.

The spring 17 is, as hereinbefore stated, always set by hand, but the spring 18 is set automatically, by part of the mechanism which I call the road apparatus, through an intermediate lever, 19. This lever, which, if the plates 9 8 10 14 23 15 are arranged upon the side of the end wall of a car, may be jointed, as shown in the drawing, turns upon a fulcrum, 20, and it terminates at its upper end in a fork, which engages with the lower end of spring 18. At its lower end, which passes through the floor of the car, and is on a level with the rails, it has an elliptic plate or bolt, 21, and at its upper end, below the plates, two springs, 25 27, are arranged for the purpose of keeping it firmly in any position in which it may be placed.

I shall now describe the third or last portion of my improved apparatus, viz., the permanent road apparatus.

This is shown in Figs. 18, 19, and 20. Of these, Fig. 18 is a plan view of the track outside of the station. Upon this I place, just outside the switch of the station, two crescent-shaped bars, 28 and 28, with the curved sides against each other, and both at a suitable distance from the rails, so as not to interfere with the passage of cars. They are placed at such a height as to always engage with the lever 19.

Just beyond the bars 28, and midway between the rails, I arrange a horizontal eccentric or cam, 29, having sharp-pointed ends. This cam is so arranged as to slide down below the level of the road, being guided between two standards, 30 30. When the cam 29 is thus brought to the level of the road, the lever 19, when the cars pass over it, remains untouched in its vertical position. The mechanism below the ground, by which the cam 29 is operated, is shown in Figs. 19 and 20 of the drawings; and it consists of the following parts:

31 is a shaft parallel to the cam 29, and at a suitable distance below it. This shaft has an eccentric, 32, which, when the shaft 31 is rotated, lifts the cam 29 out of the ground twice in each revolution. At one end of the shaft 31 is a tooth or ratchet wheel, 33, having four teeth, and engaging with the spring-pawl 34. 35 is a vertical arm, moving vertically, and provided with a strong spring, 36. The vertical arm 35 and the spring-pawl 34 are bolted together below the ground, as shown at 37, so that when the arm 35 is depressed it carries with it the spring-pawl. This, engaging with the ratchet-wheel 33, turns the latter the space of one tooth; or, in other words, it causes the shaft 31 to make one-fourth of a revolution, thus shifting the position of the cam 29. Thus, when the cam 29, previous to the arrival of the train, was above the ground, it is now brought below, and vice versa. The arm 35 is operated by means of the slanting bridge 38, which is depressed by means of a suitably-shaped bolt, $D^9$, arranged for the purpose in front of the locomotive. This bolt, shown in detail in Fig. 21 of the drawing, is preferably provided with a friction-roller, insulated by a lining of rubber, or other suitable insulating material. In order to prevent the cam 29 from being raised or lowered by any object except passing trains, it may be protected by any suitable device. For instance, a suitable box may be constructed around it—in such a manner, however, as not to interfere with the action of the bolt of the locomotive.

The manner in which the mechanism just described regulates the train apparatus is as follows:

When a train departs from a station it is first necessary that it should be put in communication with one of the telegraph-lines A, and through it with the station apparatus, &c. It is also necessary that every alternate train should be put in communication with a different telegraph-line, and thus with a different dial-hand, &c., at the station. This is accomplished by the lever 19, which, by coming in contact with the bars 28, Fig. 18, will assume a vertical position, while it obtains its proper position for the trip from the cam 29, the position of which has been regulated by the previous train. If that train, for instance, has raised the cam, it will now be lowered, and the lever will thus maintain its vertical position. In other words, the train will be put in communication, when the circuit is closed, with the telegraph-line communicating with plate 23. The next following train will, by the bolt $D^9$ on the locomotive, raise the cam 29, thus causing the lever 19 to be pushed aside, in which position it is retained by the springs 25 27, thus causing the train apparatus to be put in communication, when the circuit is closed, with the telegraph-line communicating with the plates 14 15. In this manner each train that leaves a station is automatically put in communication with a telegraph-line different from the preceding or succeeding trains.

In order to comprehensibly illustrate the perfect operation of my improved signal apparatus, I will now first briefly renumerate its various principal parts, and their disposition. This done, the operation of the complete apparatus will be readily understood. The stations being all similarly equipped, it will only be necessary to describe one of them.

Supposing the station to be located on a railroad-line, between two others, (the middle station may be named Baltimore, and the two others Washington and Philadelphia, respectively.) The station Baltimore must then be equipped with two complete outfits of station apparatus, to control the lines to the two end stations. The stations Washington and Philadelphia each have one station apparatus to control the lines between them and Baltimore, and another to control the lines to the stations beyond them. Each station apparatus is, for convenience, arranged upon a wooden table, 40. It embraces the current-reverser, the reversing appliance, the recording apparatus, and the relays which operate the recording mechanism. Each table has, in front, nine contact-screws, for convenient connection with the different lines of wires. C C' are to the station telegraph apparatus not shown in the drawing. F F' are to the lines A A. G is to earth. Each of these screws is connected to the correspondingly-lettered plate of the reversing appliance D. L $L^1$ $L^2$ $L^3$ are to the negative and positive poles of the line and local batteries, respectively. $L^1$, the positive pole of the line-battery, is connected with the second and fourth rings or plates $i^1$ $i^1$, of the dial of the current-reverser. L, the negative pole of the line-battery, is connected, at the opposite side of the dial, with the rings $i$ $i$ and staples $i^2$ $i^2$, the current having first traversed the windings of the electro-magnet $P^5$ at the signal-bell Q. $L^3$, the positive pole of the local battery, is connected, by a wire, 41, first to a binding-screw, 42, where it connects with the wire of the electro-magnet P. From thence the wire 41 passes to a second binding-screw, 43, where it connects with the wire of electro-magnet P¹. The opposite ends of the wires of the electro-magnets P P¹ are connected by binding-screws 44 45 to wires 46 47, that lead to the legs of the relays O O³, respectively. The negative pole L² of the local battery is connected by a wire, 48, to the framing 49 of the keeper-springs O¹ O¹ of the relays O O³.

A wire, 50, leads from the metallic body of the clock-work H' to a binding-screw, 51, where it connects with the wire of the relay O³, the other end of which connects, at screw 52, to a wire, 53, leading to the rail E' of the reversing appliance. Similarly a wire, 54, leads from clock-work H to screw 55, and connects with the wire of relay O, the other end of which connects, at screw 56, with wire 57, leading to rail E of the reversing appliance D.

The construction and arrangement of the train apparatus and the road apparatus have already been fully described, and it now only remains to describe the disposition of the line-contacts upon the railroad. This is substantially as follows:

Take, as an instance, the distance between stations, Washington and Baltimore, and divide it into sixteen (16) sections of equal length. Upon each of the two sections nearest to each station I place two contacts, and upon each of the remaining twelve sections I place only one, thus making in all twenty contacts. The two contacts nearest to the stations should be placed just outside the station sidings or switches. The twelve contacts (which I will call the "line-contacts" to distinguish them from the four nearest to each station, which I will call the "station-contacts,") should be at equal distances from each other. The station-contacts should likewise be equidistant, and the distance between the respective contacts is thus known, provided the distance between any two of them is known. The line between Washington and Baltimore being thus provided with twenty contacts, the dials K of the two station apparatus controlling this line must be divided into twenty degrees each, as hereinbefore stated. It is obvious that the contacts may be arranged in any suitable manner, different from the one described, without departing from the spirit of my invention.

I shall now proceed to describe the operation of my invention. To illustrate this it will be best to follow the movements of a train, taking Washington as the departure-station. At the time of departure the hands I I' of the dials K of both station apparatus must be at zero (the first degree to the right of staples $i^2$ $i^2$.) Immediately upon leaving the station the lever 19 of the train, being first put in a vertical position by bars 28 28, engages with or passes over the plate 29, the position of which has first been regulated by the bolt D⁹ in front of the locomotive in the manner described, thus putting the spring 18 in the conductor's cab in position for the trip— for instance, on plate 14, as shown in the diagram, Fig. 22. The spring 17 must rest on plate 8. On reaching the first station-contact the line-circuit is closed. (The circuit being already described, it is not necessary to trace it here.) The result of this is, that at each of the stations (Washington and Baltimore) the local circuit is closed by the relay O³, which marks the precise time of the contact upon the recording-cylinder. The local circuit embraces the electro-magnet P¹, which operates, moving the hand I' forward one degree upon the dial. The relay O and electro-magnet P are, for the time being, out of the circuit. Upon the train the hand $r$ of dial R in the engineer's cab is moved forward one degree, actuated by the electro-magnet T', which is embraced in the line-circuit.

At each following contact the operation just described is repeated, the signals being the same at both stations. The position of the hands I' indicate at the stations the exact position of the train, the recorder shows the speed of the train, and, by referring to the dial-hand $r$, the engineer of the train can easily find his position at any time.

When the train reaches the first station contact, (the fourth from Baltimore,) the hands I' I' of the dials K at both stations have reached the staples $i^2$ $i^2$, which are charged with a negative current. The result of this is that the signal-bells Q at the stations (operated by electro-magnets P⁵) and the bell Z' on the train (operated by X') are thrown into operation, the current passing now in a reverse direction, thus giving warning to the engineer that he is approaching the station, to the station officials at Baltimore that the train is approaching the station, and to the station officials at Washington that the train is so near Baltimore that they need no longer watch its movements. The hand $s$ of the dial S in the engineer's cab is at the same time changed from "clear" to "block," in which position it remains until the train reaches the first line-contact on the other side of Baltimore, where the current is again reversed by the hand I' of the Baltimore current-reverser passing off staple $i^2$ onto the ring $i^1$. The time of the departure and arrival of the train and the time that each contact is made may be read off the recording-cylinders at the stations.

From the foregoing description it will be easily seen how the movements of a single train are completely controlled by my apparatus. I shall now proceed to describe the operation when two trains are upon the line at the same time.

Suppose the first train has left station Washington, and is at any point upon the line between Washington and Baltimore. Then, when a second train leaves Washington its lever 19 will be operated by the plate 29, which is regulated by bolt D⁹ upon the locomotive in such a manner as to place the spring 18 in the conductor's cab upon plate 23 instead of, as on the first train, upon plate 14. When the contacts are reached it will, therefore, be the relays O, electro-magnets P, and dial-hands I at the stations which are operated, the relays O³, electro-magnets P¹, and hands I' being meanwhile out of the circuit. Upon the train the indications are the same as upon the first train. If the distance between the two trains remains four or more contacts, (the lengths of the staples K¹ K² of the hands I I' being equal to three and one-half dial-degrees,) there will be no demonstration by the apparatus; but if the dial-hand I', which, at the stations, indicates the position of the first train, should be overtaken by the second hand I, (by the second train overtaking the first,) the hand I will be lifted off the dial and off contact with ring $i^2$, by the staple K, which, being charged with a negative current, reverses the current and gives the stop-signal to the second train. The engineer of this, by referring to the dial-hand $r$, can easily find his position, and guide the movements of his train accordingly.

If, instead of following each other, two trains should approach each other, coming from opposite directions on the same line of rails, the result will be as follows:

In case the station apparatus of both trains, leaving, for instance, Washington and Baltimore at the same time, have been put in communication with the same telegraph-line by the road apparatus outside the respective stations, then the operation of the apparatus will be perfectly automatic. If, for instance, both trains communicate with the telegraph-line controlling the hands I' I' of the dials at both stations, the hands I' I' will, each time the line-circuit is closed by either train, be moved forward one degree upon the respective dials. I have already described the arrangement of the contacts upon the railroad-line. Now, presuming the distance between Washington and Baltimore to be thirty-two miles, upon which twenty contacts have been distributed in the manner described—that is, four station-contacts upon the four miles nearest to each station, and the remaining twelve (line-contacts) upon the remaining stretch of twenty-four miles—the first four miles traveled by each train will consequently close the line-circuit eight times, and cause the dial-hands I' at the station to travel eight degrees upon the dial. The next eight contacts closed by the two trains, being two miles apart, will be equivalent to a distance of sixteen miles, which, added to the eight miles already traveled, makes twenty-four miles, thus leaving the trains only eight miles apart. The dial-hands I' I' at the stations have in the meantime traveled sixteen degrees, (sixteen contacts having been closed by the two trains,) and have, consequently, almost reached the staples $i^2$ upon dial K. The next contact that is made by either train carries the hands I' over upon staples $i^2$, which are charged with a negative current. The result is, that the current is instantly reversed, thus giving the "stop" signal to both trains, which are still more than four miles apart. If one of the trains receives the stop-signal before passing the last station-contact it should return immediately to the station, because the other train will then be nearer than four miles, having made nearly all the line-contacts, which are two miles apart. In order to discontinue further indications, however, the spring 17 in the conductor's cab of the backing train should first be put upon the free insulated plate 9, thus breaking the circuit. If outside the station-contacts, the trains should slacken speed, and stop in contact with the nearest line contact. The springs 17 in the conductor's cab may now be placed upon the plates 10, which connect with the train-telegraph apparatus 11, which again, through wire 12 and spring 13 pressing upon the car-axle, communicates with the rails, thus establishing a circuit between the two trains, which may now exchange signals. Signals may also be exchanged by either train with the stations, provided the station officials bring the station-telegraph apparatus in the circuit through the plates C C' of the reversing appliance D.

If the two trains traveling against each other are in communication with a different telegraph-line, it must immediately attract the attention of the station officials, because the hands I I' will then both move upon dial K, although only one train has left the station. The stop-signal may then immediately be given to either or both trains, by moving either or both hands upon dial K until it or they reach the staples $i^2$, thus reversing the current, and giving the stop-signal.

The foregoing description of the construction and combination of the operative parts of my invention will sufficiently demonstrate its advantages. At stations where a large number of trains enter and leave, a control of the movements of such trains within a certain distance is absolutely necessary, in order to prevent collisions and delays, aside from the desirability of keeping a record of the time kept by each train, and of its position at any one time. These duties, and many others are performed automatically by my improved apparatus in a superior manner, and with but slight attention. Its construction is comparatively simple and inexpensive, and it is easily managed and operated.

Having thus described my invention, I claim and desire to secure by Letters Patent of the United States—

1. The clock-works H H', insulated from each other by bone plates $f$, or in any other suitable manner, having hand-spindles $e$ $e'$, arranged one within the other, in the manner described, and for the purpose set forth.

2. The combination of clock-works H H' and electro-magnets P P¹, operating the spindles $e$ $e'$, respectively, substantially as and for the purpose shown and specified.

3. The dial K, having metal rings $i$ $i$ $i^1$ $i^1$, connected by wires to the negative and positive poles of the line-battery, respectively, substantially as and for the purpose shown and specified.

4. The combination of rings $i\ i$ and staples $i^2\ i^2$, they being in metal contact by a connecting-strip, $k$, substantially as and for the purpose shown and specified.

5. The dial K, having metal staples $i^2\ i^2$ and rings $i\ i\ i^1\ i^1$, in combination with the hands I I', substantially as and for the purpose herein shown and specified.

6. The hand I, consisting of two hinged parts, having springs $k^4\ k^2$, and insulating bone plate, carrying the hinged staple $K^1$, the whole carried by the hollow spindle $e$ of the upper clock-work H, substantially as and for the purpose herein shown and specified.

7. The hand I', constructed like the hand I, and carried by the spindle $e'$ of the clock-work H', substantially as and for the purpose herein shown and specified.

8. The alarm-bell Q, operated by an electro-magnet, $P^5$, the winding of which is formed by or connected to the negative wire of the line-battery, before its connection to rings $i\ i$ and staples $i^2\ i^2$ of dial K, substantially as and for the purpose herein set forth.

9. The dial K, having rings or plates $i^1$ connected to the positive pole of the line-battery, and rings $i\ i$ and staples $i^2\ i^2$ united by strip $k$, and connected to the negative pole of the line-battery, hands I I' having insulated staples $K^1\ K^2$ and contact-springs $k^2\ k^3$, clock-works H H', having spindles $e\ e'$, through which they are in metal connection with hands I I', respectively, relays O $O^3$, one end of the windings of which are connected with the clock-works H H', respectively, and the other end with the plates E E' of reversing appliance D, all constructed, combined, and arranged to operate in conjunction with the recording mechanism operated by relays O $O^3$ when the line-circuit is closed, substantially as and for the purposes herein shown and specified.

10. The combination of the parts H H' $e\ e'$ K $i\ i\ i^2\ i^2\ i^1\ i^1$ I I', forming the apparatus for automatically reversing the line-current, with the electro-magnetic alarm-signal Q, the electro-magnet for which, $P^5$, is embraced in the line-circuit, as described, and with the electro-magnets P $P^1$ embraced in the local circuit, the electro-magnets P $P^1$ being arranged to operate the hands I I' whenever the local circuit in which they are embraced is closed by the closing of the line-circuit, substantially as and for the purposes herein shown and specified.

11. The record-cylinder N, having time-sheet $O^8$, relays O $O^3$ embraced in the line-circuit, metal framing 49, springs $O^2\ O^2$, armatures $O^1\ O^1$, and markers $p\ p^1\ p^2$ affixed in the latter, so as to operate when the local circuit is closed by the closing of the line-circuit, the whole forming part of and operating in conjunction with the station apparatus of my improved railway-signal apparatus, as and for the purpose shown and specified.

12. The clock-work M, brackets $M^2\ M^3$, rod $m^2\ m^3$, cylinder N, carrying time-sheet $O^8$, pinion $n$, gear-wheel $n^1$, operated by a coiled spring in box $n^2$, relays O $O^3$ and markers $p^1$, all combined and arranged to operate in conjunction with the remainder of my improved apparatus, substantially as described, for the purpose specified.

13. The connection, through wire 50, between the metal body of the clock-work H' and one end of the winding of the electro-magnet $O^3$, the other end of which is connected to the station apparatus rail E' of the reversing appliance D, and the similar connection of clock-work H, through wire 54, with one end of the winding of relay O, the other end of which connects to rail E of the reversing appliance, substantially as herein shown and specified.

14. The train-indicating apparatus, consisting of the dials R S, having rotating hand $r$ and vibrating hand $s$, arranged, with their operating mechanism, within box $S^5$ in the engineer's cab on the locomotive, substantially in the manner and for the purpose shown and specified.

15. The shaft U, having projections $w'\ w'$ for operating the wheel V, and arm or bracket W, in combination with the shaft W', having conical circumferential projection $w'$, and spring X, substantially as and for the purpose shown and specified.

16. The device for returning the hand $r$ of dial R to zero, by pressing upon button $r'$ on the outside of box $S^5$, consisting of shaft U having bracket W, shaft W' having conical circumferential projection $w'$, and spring X, wheel V, arranged upon the hand-spindle of clock-work T, and having sidewise-projecting-pin $v$, all combined and arranged to operate in conjunction with clock-work T and electro-magnet T', substantially as and for the purpose herein shown and specified.

17. In combination with the polarized relay X', keeper $x$, and vibrating spindle $x'$, having upward-projecting arm Y, the alarm-bell Z', and pivoted lever Z, having spring $z$, and hammer $z'$, arranged to sound bell Z', when the hand $s$ of dial S, by the action of the electric current and the operating mechanism, is pointed to the division of dial S, marked "block," thus warning the engineer that his train is approaching a station, or is in a dangerous position, substantially in the manner and for the purpose herein shown and specified.

18. The reversing or regulating appliance in the conductor's van, consisting of the six metallic plates 8 9 10 14 15 23, arranged around the central pin 16, upon which turn the two springs 17 and 18, independent of, but in metal contact with, each other, substantially in the manner and for the purpose shown and specified.

19. The connection, through wire $v^4$, between the upper central plate 8 in the conductor's van, and the contact-screw 1 on box S⁵, and through it with the apparatus in the box, substantially as and for the purpose described.

20. The wire connection between plate 10 and the train-telegraph apparatus 11, the earth-line of which is established by a wire, 12, leading to a spring, 13, pressing upon the axle of the car, substantially as described, for the purpose specified.

21. The free insulated plate 9, plate 8, connected with the train apparatus in box S⁵, plate 10, connected with the train telegraph apparatus; plates 14 and 15, connected with one of the train-contacts $d$, and plate 23, connected with the remaining train-contact $d$, and the springs 17 18, the latter operated automatically by forked lever 19, all combined and arranged to operate in conjunction with my improved railway-signal apparatus, substantially as described, for the purposes hereinbefore set forth.

22. The forked lever 19, having its fulcrum at 20, and operating with its upper forked end the spring 18, and having its lower end arranged to engage with the track mechanism, substantially in the manner and for the purpose herein shown and specified.

23. The arrangement upon a railroad-track of two crescent-shaped bars, 28 28, for correcting the position of lever 19 upon the train, substantially as described, for the purpose specified.

24. The cam 29, arranged upon a railroad-track, beyond bars 28 28, and operated by suitable mechanism, for the purpose of adjusting the position of levers 19 of passing trains, thus putting the signaling mechanism of each train into proper working order, substantially as described, for the purpose specified.

25. The mechanism for operating the cam 29, which slides vertically in guides or standards 30 30, consisting of shaft 31, having eccentric 32 and ratchet-wheel 33, spring-pawl 34, engaging with ratchet-wheel 33, and operated by vertical bar 35, to which it is bolted, coil-spring 36, arranged upon bar 35, and forcing it up against a slanting pivoted bridge, 38, all combined and arranged to operate substantially in the manner and for the purposes herein shown and specified.

26. The herein-described electric railway-signal apparatus, consisting, besides two lines of telegraph-wires and contact-points, arranged substantially as described, of three principal parts, viz., the "station apparatus," the "road apparatus," and the "train-apparatus," the first consisting essentially of an automatic current-reversing device, operated by electro-magnets in the local circuit, and so constructed as to reverse the current of the line-circuit, and thus, by intermediate mechanism give signals to the train and station officials whenever a train approaches a station or is in danger of collision; and a recording mechanism, by which the time of arrival and departure of trains and their passing certain given points is automatically registered; the second, (the "road apparatus,") consisting essentially of devices for automatically regulating the train-apparatus and putting it in communication with the proper telegraph-line wire; and the third, (the train-apparatus,) consisting essentially of indicating devices, by which the engineer is informed of the exact position of his train, and signal devices, by which he is informed of his approach to a station, or of "danger ahead," and of a current regulating and reversing device by which a train may be placed in telegraphic communication with another train, or with a station, all constructed, combined, and arranged to operate in conjunction with each other, substantially as described, for the purposes shown and specified.

The foregoing specification of my new and useful invention signed by me this 20th day of April, 1876.

HAKON BRUNIUS.

Witnesses:
V. WIESSENGUSSER,
C. W. LINDGUIST.